United States Patent
Jung et al.

(10) Patent No.: US 8,275,775 B2
(45) Date of Patent: Sep. 25, 2012

(54) PROVIDING WEB SERVICES FROM BUSINESS INTELLIGENCE QUERIES

(75) Inventors: Michael Jung, Quierschied (DE); Christian Klensch, Angelbachtal (DE); Richard Putz, Heidelberg (DE); Markus Heluut Kahn, Walldorf (DE); Hartmut Koerner, Ladenburg (DE); Andreas Paul, Kirkel (DE); Joachim Brechtel, Homburg/Saar (DE); Stefan-Claudius Mueller, Eggenstein-Leopoldshafen (DE); Markus Boehm, Ludwigshafen (DE)

(73) Assignee: SAP AG, Walldorf (DE)

( * ) Notice: Subject to any disclaimer, the term of this patent is extended or adjusted under 35 U.S.C. 154(b) by 317 days.

(21) Appl. No.: 12/684,233

(22) Filed: Jan. 8, 2010

(65) Prior Publication Data
US 2011/0173203 A1  Jul. 14, 2011

(51) Int. Cl.
*G06F 7/00* (2006.01)
*G06F 17/30* (2006.01)
(52) U.S. Cl. .................................................. 707/741
(58) Field of Classification Search .................. None
See application file for complete search history.

(56) References Cited

U.S. PATENT DOCUMENTS

| | | | |
|---|---|---|---|
| 2006/0265352 A1 | 11/2006 | Chen et al. | |
| 2007/0061305 A1* | 3/2007 | Azizi | 707/3 |
| 2007/0156839 A1 | 7/2007 | Batra et al. | |
| 2007/0162491 A1* | 7/2007 | Schmitz et al. | 707/103 R |
| 2008/0301086 A1* | 12/2008 | Gupta | 707/2 |
| 2009/0119309 A1* | 5/2009 | Gibson et al. | 707/100 |

OTHER PUBLICATIONS

European Search Report for EP 11 00 0048, dated Oct. 28, 2011.
Rahm, E., et al., "Web Und Datenbanken Konzepte, Architekturen, Anwendungen", Chapter 6, Datenintegration und Mediatoren, 2003, pp. 163-190, XP-002444450.
Pahwa, J.S., et al., "Accessing Biodiversity Resources in Computational Environments from Workflow Applications", 2006, pp. 1-10.

* cited by examiner

*Primary Examiner* — Uyen T. Le
(74) *Attorney, Agent, or Firm* — Kenyon & Kenyon LLP

(57) ABSTRACT

In an embodiment of the invention, analytical data may be extracted from a business intelligence (BI) system on criteria specified in metadata of a business intelligence query. Once the data is extracted from the BI system, the extracted content may be provided in the context of semantic identifiers. In an embodiment, the semantic identifiers may provide a description of the extracted content associated with the identifier. In one embodiment, the semantic identifiers may be obtained from the criteria specified in the query. In another embodiment, the semantic identifiers may be defined in and obtained from a separate enterprise service repository. In an embodiment, a proposed mapping between query elements and semantic identifiers may be suggested by a processor.

17 Claims, 7 Drawing Sheets

FIG. 1

MDX Statement 110

```
SELECT
    { [Measures].[0D_DOCUMENT],
      [Measures].[0D_OORVALSC]
    } ON COLUMNS,
    NON EMPTY
      [0D_PLANT].MEMBERS
    ON ROWS
FROM [$0D_SD_C03]
WHERE
    ( [0CALMONTH].[200101],
      [0D_COUNTRY].[US] )
```

Data Set Output 120

```
<CellData>
    <Cell CellOrdinal="0">
        <Value xsi:type="xsd:double">16890</Value>
        <FmtValue>16,890.00</FmtValue>
        <FormatString>Standard</FormatString>
    </Cell>
    <Cell CellOrdinal="1">
        <Value xsi:type="xsd:int">50</Value>
        <FmtValue>50</FmtValue>
        <FormatString>Standard</FormatString>
    </Cell>
    <Cell CellOrdinal="2">
        <Value xsi:type="xsd:double">36175.2</Value>
        <FmtValue>$36,175.20</FmtValue>
        <FormatString>Currency</FormatString>
    </Cell>
</CellData>
```

Prior Art

FIG. 3

```xml
<item>
<SEQUENCE_ORDINAL_NUMBER>2</SEQUENCE_ORDINAL_NUMBER>
<RESULT_TYPE_CODE>2</RESULT_TYPE_CODE>
<_OCRM_SOLDTO>
    <ID>3271</ID> <DESCRIPTION>Media Store</DESCRIPTION>
    <LANGUAGE_CODE>en</LANGUAGE_CODE>
</_OCRM_SOLDTO>
<_OCRM_OBJ_ID> <ID /> </_OCRM_OBJ_ID>
<_OCRMORDQTYV>
    <QUANTITY> <VALUE>3000.0</VALUE> <UNIT_CODE>PCE</UNIT_CODE> </QUANTITY>
</_OCRMORDQTYV>
<_ONETPRCORD>
    <AMOUNT> <VALUE>200.0</VALUE> <CURRENCY_CODE>USD</CURRENCY_CODE> </AMOUNT>
</_ONETPRCORD>
<_OGRSVALORD>
    <AMOUNT> <VALUE>600000.0</VALUE> <CURRENCY_CODE>USD</CURRENCY_CODE> </AMOUNT>
</_OGRSVALORD>
<_ONETVALORD>
    <AMOUNT> <VALUE>638297.87</VALUE> <CURRENCY_CODE>EUR</CURRENCY_CODE> </AMOUNT>
</_ONETVALORD>
</item>
```

PROVIDING WEB SERVICES FROM BUSINESS INTELLIGENCE QUERIES

BACKGROUND

Organizations rely on business intelligence (BI) to support decision-making. Business intelligence may support business decision-making by extracting information from business intelligence systems (such as data warehouses, for instance), analyzing the extracted information, and organizing the analyzed results into a desired structure to facilitate business decision-making. In some instances organizations may use different business warehouse systems, data analysis systems, and systems to organize or present the analyzed data in a desired structure. Each of these different systems may contain applications supplied by different vendors, and therefore have different interoperability interfaces.

Various protocols have been developed to ensure interoperability of these different business intelligence components. XML for Analytics (XMLA) is a simple object access protocol interface that is commonly used for data access for analytical purposes. However, XMLA requires multidimensional expressions (MDX) language statements to extract and manipulate data from online analytical processing databases typically found in business intelligence systems. Writing MDX statements requires programming skills which implies additional costs because of the necessary developer profiles required. Additionally, even if a developer of a consumer application is able to formulate a MDX statement to extract and manipulate the desired data, the resulting non-semantic output, an example of which is shown in FIG. 1a, is difficult to understand.

FIG. 1 shows an exemplary format of an input MDX statement 110 and an exemplary format of an output data set 120 when using XMLA. Creating MDX statements, such as statement 110, may not be intuitive for developers of consumer applications who may be unfamiliar with the formatting requirements and specifications of MDX. Developers of consumer applications may also have difficulty understanding the significance of XMLA data set output 120. For example, while the output 120 contains specific data values, such as 16890, 50, and 36175.2, there is no description or semantic meaning associated with the specific data values listed. Thus, it is not clear from the output 120 what the $36175.20 currency figure represents.

One reason that XMLA data set outputs, such as data set output 120, do not contain descriptions or semantic identifiers associated with the specific data values is that XMLA is designed to access and retrieve data from any BI system data provider. Because XMLA is designed as a universal protocol for accessing data from any data provider, the interface and the data set output 120 is generic and non-semantic.

However, in organizations with multiple computing systems, additional flexibility in using data output from business intelligence systems may be necessary. For example, instead of directly presenting the data set output, an organization may want to export the business intelligence system data output to another system, such as an enterprise resource planning system or a customer relationship management system. To ensure compatibility with these systems, the output data may have to be transformed to a format recognized by the other systems. The non-semantic query result output from these business intelligence systems makes it difficult for an organization to integrate the query result output into other systems and applications.

While it may be possible to manually create a program that provides the results of business intelligence system queries in a desired, semantically meaningful output format, the necessary manual implementation would be cumbersome and inefficient. Every time a new query is created or an existing query is substantially modified, the program would have to be altered to provide the queries results into the desired format. Not only is this process cumbersome and resource intensive, but it may also require specialized programming skills that may limit the number of individuals in an organization who can manually modify the program.

Other interfaces such as the Business Intelligence Consumer Services do not overcome these limitations. Although these interfaces support object models enabling selection of desired search criteria through a graphical user interface instead of through a programming syntax such as MDX, these interfaces also produce the same non-semantic output 120 shown in FIG. 1.

There is a need for an interface tool that automatically provides generic business intelligence system query results in an intuitive semantic structure easily consumable by other systems in an organization while providing non-programming, declarative data access.

BRIEF DESCRIPTION OF THE DRAWINGS

FIG. 1 shows an exemplary format of an input MDX statement and an exemplary format of an output data set when using XMLA.

FIG. 3 shows an exemplary part of the output in an embodiment of the invention.

DETAILED DESCRIPTION

In an embodiment of the invention, business intelligence content may be extracted from a BI system based on criteria specified in metadata of a business intelligence query. Once the business intelligence content is extracted from the BI system, the content may be exposed along with its semantic meaning. In an embodiment, semantic identifiers may provide a description of the extracted content associated with the identifier. In one embodiment, the semantic identifiers may be obtained from the criteria specified in the query. In another embodiment, the semantic identifiers may be defined in and obtained from a separate enterprise service repository. In an embodiment, a proposed mapping between elements of the query and the semantic identifiers may be suggested by a processor. The proposed mapping may be adaptive and may suggest a mapping in view of related mappings previously selected by one or more users.

Figure 2:
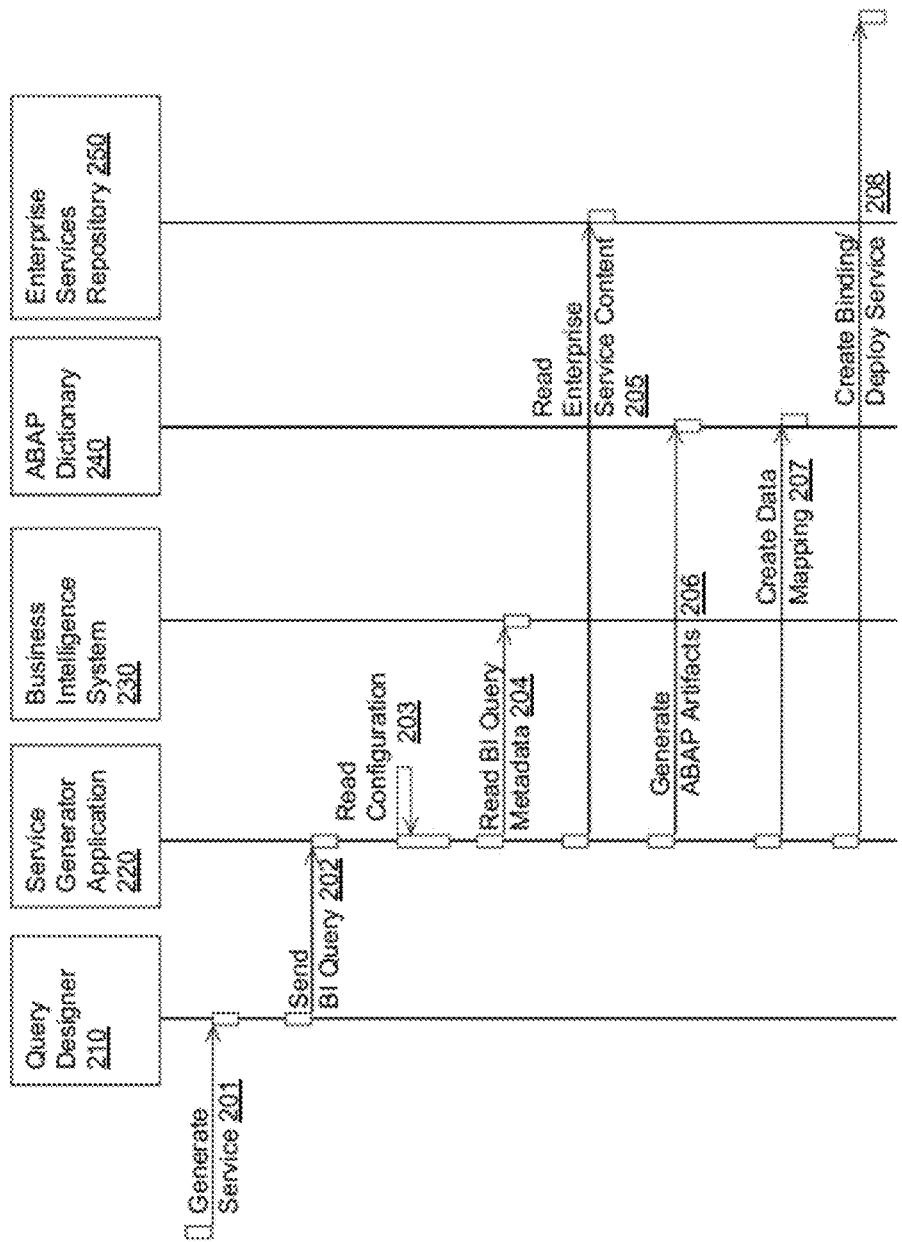
FIG. 2 shows an exemplary data flow sequence of generating a web service in an embodiment.

FIG. 2 shows an exemplary data flow sequence when creating such a web service in an embodiment of the invention. In an embodiment, a request to generate a web service 201 may be initiated. Such a request may be initiated in some embodiments through an automatic call in an application program or a manual activation, such as by a user a clicking on an icon to generate the web service. In other embodiments, the request to generate a web service 201 may be initiated through other techniques or conditions. In an embodiment, the web service generation request 201 may be triggered in a query designer application 210.

In an embodiment, a query designer application 210 may include a set of computer instructions that, when executed by a processor, allow a user to design a business intelligence query to retrieve data from a business intelligence system. A query designer 210 may provide a graphical user interface for a user with little programming experience to enable the user to design a suitable query by pointing and clicking and/or dragging objects in an embodiment. In an embodiment, the web service generation request 201 may be triggered after a query is created, displayed or modified in the query designer application 210, though in other embodiments, the web service generation request may be triggered from another application. Once a web service generation request 201 has been initiated, a business intelligence system query 202 related to the web service generation request 201 may be sent to a web service generator application 220. In an embodiment, the business intelligence query 202 may be selected by a user before or after the web service generation request 201 is initiated. In an embodiment, the business intelligence system query 202 may be selected from the query designer application 210. In an embodiment, the business intelligence query 202 associated with a particular web service request 201 may be identified by user input through a database or lookup table.

In an embodiment, once the business intelligence query 202 has been identified, one or more configurations 203 corresponding to application logic or fields of the query 202 may be retrieved by the service generation application 220. Configurations 203 may be retrieved by the service generation application 220 in different embodiments before or after business intelligence content data is extracted from the business intelligence system 230.

In an embodiment, each configuration may contain a mapping between fields in a business intelligence query and corresponding fields in a web service output. In an embodiment, the fields in a web service output may include structures and elements typed by data structures and data types specified in the business intelligence system query 202. In another embodiment, the fields in a web service output may include structures and elements typed by data structures and data types specified in an Enterprise Service Repository. In an embodiment, the selected business intelligence system query 202 may be used to retrieve business intelligence metadata 204 from the business intelligence system 230 responsive to the query 202. In an embodiment, the metadata 204 sent from the business intelligence system 230 responsive to the query 202 may contain the desired results of the query. In an embodiment, the configuration 203 associated with the query 202 may be used to identify the portions of the returned metadata 204 containing the desired results.

Once the portions of the metadata 204 containing the desired results have been identified, content 205 corresponding to the identified metadata 204 may be read from enterprise services repository 250. In an embodiment, the content 205 read from the repository 250 may be identified by comparing one or more objects in the metadata 204 to a mapping to identify the corresponding data types in the repository 250.

Once the portions of the metadata 204 and/or the corresponding content 205 from the enterprise services repository 250 have been identified, new artifacts may be created using the corresponding web service output fields in the configuration 203 and/or corresponding content 205 from repository 250, as well as the portions of the metadata 204 containing the desired results. The new artifacts in an embodiment may contain programming instructions specifying a structure of an output of the web service request 201. Each of the new artifacts 206 and associated configurations 203 may be customized for different programming languages, such as ABAP, or user-configured data structures. Each of the artifacts 206 may also be stored in an ABAP dictionary 240 in an embodiment.

In some embodiments, the data elements used in business intelligence systems and queries may not directly correspond to data elements used in other systems of the organization. For example, in an embodiment where pre-existing business intelligence systems and content is used to create business intelligence queries 202, the query elements and fields in the business intelligence queries 202 may not directly correspond to elements and nodes of business objects used in some other computing systems of the organization. In such a circumstance, it may be necessary to create a transformation rule 207 for structure and value mapping between the two systems based on the content 205 obtained from the repository 250. In an embodiment, programming instructions based on the transformation rules 207 for each of the data elements in the selected business intelligence query 202 may be created and stored in an ABAP dictionary 240.

In different embodiments, a plurality of pieces of programming instructions specifying the output structure and/or mapping of data elements in the business intelligence system query output may be stored and used. For example, in an embodiment, multiple programming instruction pieces may be combined, where each instruction piece is limited to mapping a portion of query elements 207 used in a particular query 202.

Once the necessary instructions have been generated, the instructions may be bound 208 to an object, action, or event, so that when a triggering condition of the object, action, or event is satisfied, the selected query 202 will execute and the results will be automatically transformed into a specified format with any further user intervention. FIG. 3 shows an exemplary output in an embodiment of the invention where a selected query 202 has been executed and the result of the query have been transformed into specified format having semantic identifiers for each output value.

For example, the tag <_0CRM_SOLDTO> may refer to a "Sold to" node in a customer relationship management system in an embodiment. Additionally, the <ID> and <DESCRIPTION> tags within the <_0CRM_SOLDTO> tag may refer to "ID" and "Description" elements within the "Sold to" node. Thus, in the example of FIG. 3, the item in the <item> tag may have been sold to a customer with ID 3271 which is named 'media store'.

The other tags in the <item> tag, such as <_0CRMORDQTYV>, <_0NETPRCORD>, <_0GRSVALORD>, and <_0NETVALORD>, may refer to order quantity, net price, gross order value, and net order value nodes respectively. In an embodiment, each of these semantic tags may refer to business intelligence query characteristics or key figures. In another embodiment, each of these semantic tag names may also refer to data structures and data types specified in an Enterprise Service Repository. Thus, once the data is exported to another system, the results can be readily processed without any additional transformational programming steps by the user.

The semantic output data shown in FIG. 3 may be designed and structured in an embodiment so the data embedded within the output can be readily used by other programs. In addition to the output data format shown in FIG. 3, other embodiments may have different output formats. For example, in other embodiments, the tag names and structure may vary depending on the business objects, nodes, and elements used in the other systems using the output from the business intelligence system. The generic XMLA output 120 shown in FIG. 1, however, may not be readily used by other programs until the data in the output is identified and associated with corresponding fields in the other programs.

Figure 4:
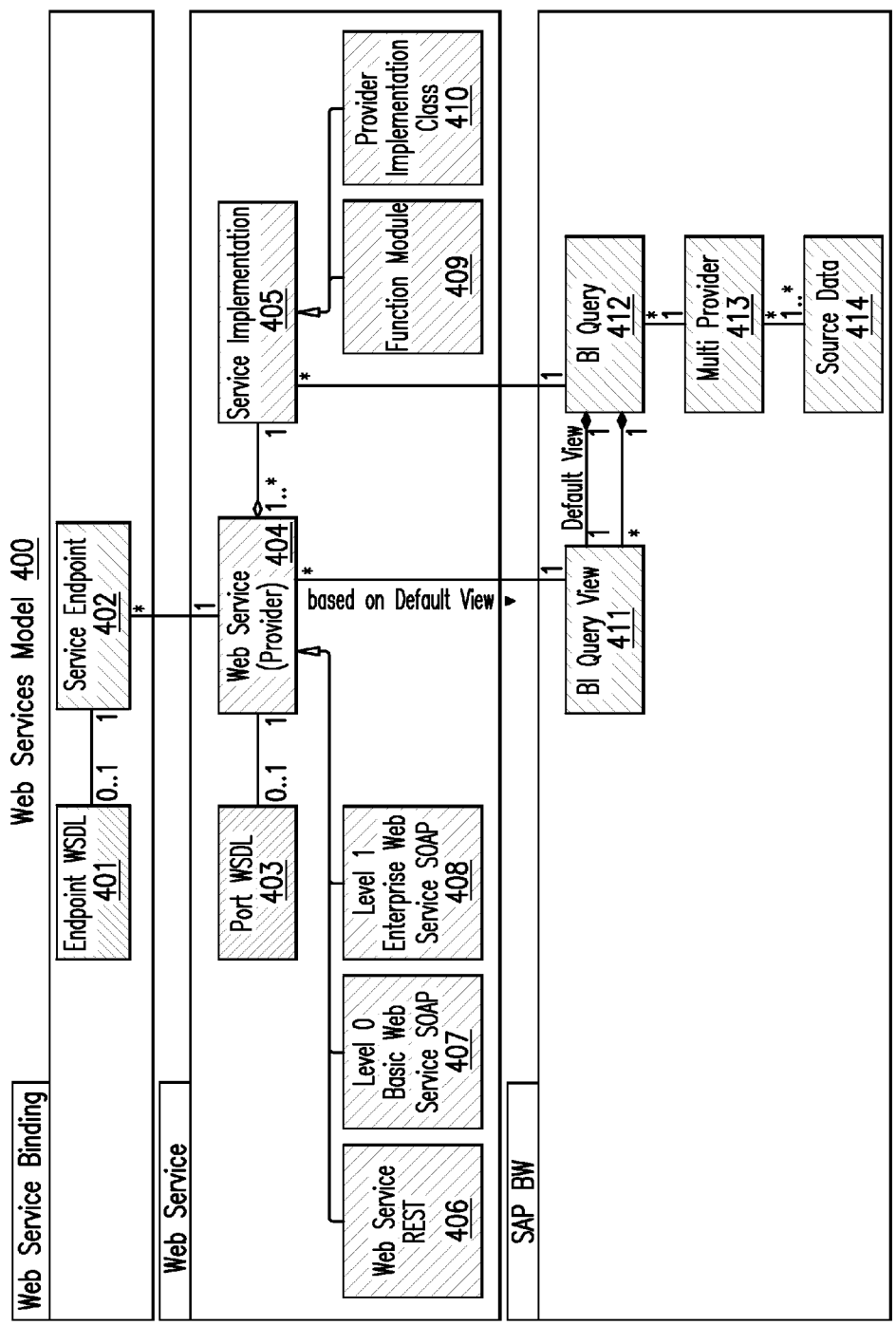
FIG. 4 shows exemplary components of service generation in an embodiment of the invention.

FIG. 4 shows an exemplary web services model 400 in an embodiment. In box 402, a web service endpoint, which may be specified by a web service definition language (WSDL) endpoint description 401, may be added to an application. The web service endpoint 402 may invoke a web services provider 404 making the web service provider 404 available for external access. The web services provider 404 is implemented by a service implementation in box 405, which may be realized as a provider class 410 or a function module 409 to transform data from BI query 412.

In an embodiment, each provider class 410 may contain a set of specific instructions in ABAP for transforming query results into a desired, semantic output format. Each function module 409 may contain a set of specific instructions in ABAP for transforming query results into a desired, semantic output format. In an embodiment multiple service implementations 405 may exist for different web services 404 to create a desired transformation service when extracting the desired BI query data.

In an embodiment, the implementation 405 of the desired transformation service may operate on a result of a BI query in box 412. Query results may be generated through a multi-provider in box 413 interacting with the BI query in box 412 and source data in box 414.

In an embodiment, the web services provider 404 may support three different types of semantics for the transformation following either the SOAP W3C standards or the Representational State Transfer (REST) service architecture style. Level 1 enterprise web service semantics in box 408 may be used when the query results from the BI system may be mapped to corresponding objects in different systems. Level 0 basic web service semantics in box 407 may be used when the query results represent the same object and/or the same semantic meanings associated with the objects of the BI system. Web service following the REST style in box 406 may be used in other circumstances when customized semantic transformations that may not be supported by level 1 or level 0 SOAP web services are needed.

In an embodiment, the type of semantics of the web service provider 404 may be selected by configuration settings in the particular context. The selected semantic type may be used in conjunction with the service implementation 405 to transform a result from the BI query to a desired semantic format. In an embodiment, the web service provider 404 may expose the BI query result based on the default query view 411.

In an embodiment, various components may be used to generate programming instructions for transforming BI query results. For example, in an embodiment configuration settings may be used to generate sets of programming instruction pieces for transforming BI query results based on mapping instructions specified in the configuration. These programming pieces may be ABAP classes, methods, Business Add-Ins (BAdIs), or other forms of program instructions.

In an embodiment, context data for a transformation, such as an identifier of a corresponding service in an enterprise service repository, an identifier of whether data is transferred synchronously, asynchronously, inbound, or outbound, or an identifier of backend system names for classes, methods, and other objects, may be used to select the proper configuration or configuration settings and set the correct variables in the programming instructions to transform the BI query results.

In an embodiment, a variable may be a user-entered field value that focuses a business intelligence query to specific data entered by the user at runtime. Thus, in an embodiment, the transformation programming instructions may change depending on the context data and the configuration or configuration settings so that some coding sequences may be omitted or included depending on the configuration selected and the context data. In an embodiment, however, some of the programming instructions may remain unchanged even though the user-entered runtime variable value may change.

In an embodiment, semantic descriptions used in the transformation of the BI query results may be included in programming instructions. The semantic descriptions may be contained in context parameters or may be specified in the configuration or configuration settings.

Figure 5:
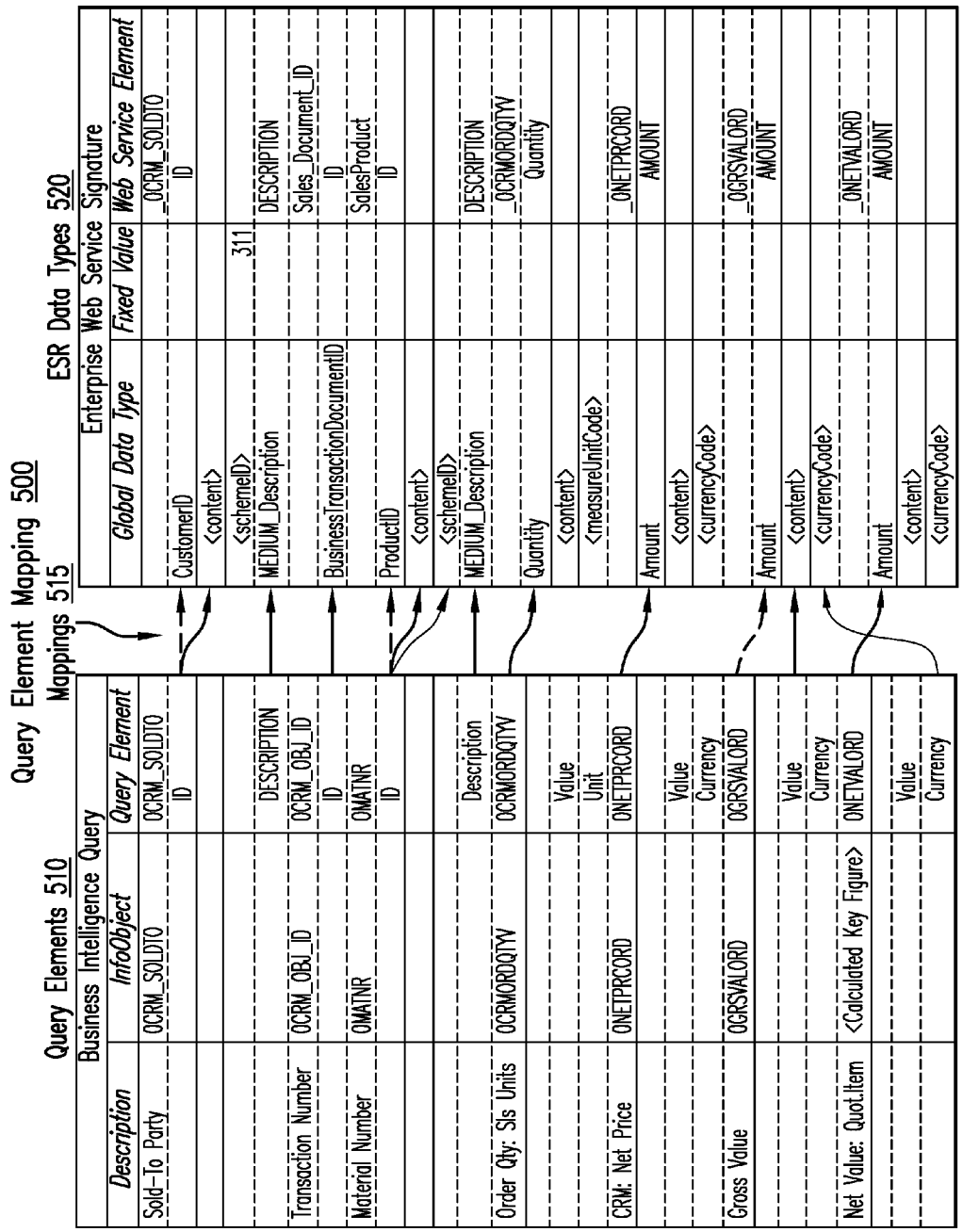
FIG. 5 shows an exemplary query element mapping in an embodiment of the invention.

FIG. 5 shows an exemplary query element mapping 500 in an embodiment of the invention. In this embodiment, the query element mapping 500 is graphical and visually shows several mappings 515 between query elements 510 in an business intelligence query and global data types 520 in an enterprise service repository. These global data types 520 may be defined individually by an organization or they may be standard data types specified by a software manufacturer.

In some embodiments, query element mappings 500 may be used to transform fields, identifiers, and elements 510 recognized by business intelligence systems to elements, objects, nodes, and data types 520 used by other systems in an organization. For example, query element 0CRM_SOLD-TO_ID recognized by the business intelligence system may be set equal to a similar content field in a CustomerID global data type 520 of web service element _0CRM_SOLDTO_ID in the enterprise service repository map list on the right of FIG. 5. Thus, data in this particular query element may be directly transferred to the corresponding global data type in enterprise service repository. Although in example the query element 510 and corresponding global data type 520 were similar, in other situations the global data types 520 may differ from the corresponding query elements 510.

For example, the Currency field of the 0NETVALORD query element 510 may map to a Currency Code field in an Amount global data type 520 of the _0GRSVALORD web services element. Other rules may perform other manipulations and transfers of data between fields.

Figure 6:
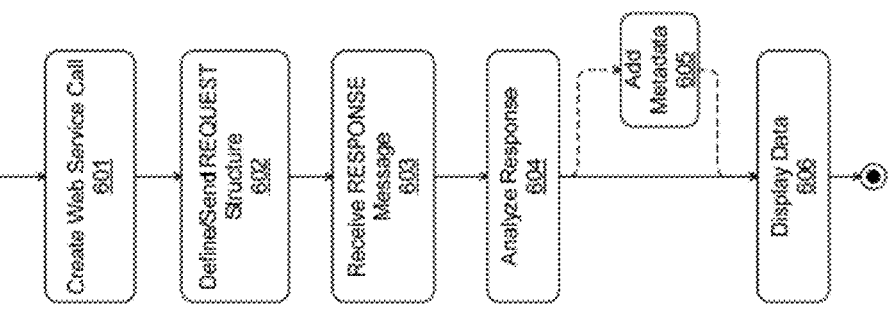
FIG. 6 shows an exemplary process in an embodiment to automatically extract an output data set from a business intelligence system query.

FIG. 6 shows an exemplary process in an embodiment to extract an output data set from a business intelligence system query. In box 601, a web service call is created. In an embodiment, a web service call may be associated with an identified business intelligence system query, so that the web service call may be used to formulate a query and retrieve data from the query results returned by the business intelligence system.

In box 602, desired data elements recognized by the business intelligence system may be included in a declarative request structure to retrieve specific data from the business intelligence system. In an embodiment, supplied values of desired data elements may be included in the declarative request structure to narrow the result to a specific data set to be used for a specific purpose. The data elements and supplied values of the data elements included in the declarative request structure may be contained in a business intelligence system query associated with the web service call. Desired values of particular elements are supplied by a user at runtime so that different values of particular elements may be used when the web service call is initiated.

Once the declarative request structure has been created with data elements and other components recognized by the business intelligence system, the web service call may be executed and the request structure may be send to the business intelligence system for data retrieval. The business intelligence system will then return the requested information.

In box 603, a response message is received from the business intelligence system which may contain the desired results. The results in the response message may be incorporated in a corresponding semantic tag or other semantic data to identify the responsive data in the results. Semantic tags and data may include an identifier or description of corresponding data. In some embodiments, the identifier or description may correspond to data structures and data types specified in an enterprise service repository.

In box 604, the response may be analyzed and optionally transformed into a desired format compatible with one or more systems using the output in the response from the business intelligence system. In some embodiments, additional metadata may be added to the restructured response output in box 605. The additional metadata may add further descriptive information for the data in the response output. Once the analysis is complete, the restructured response output may be processed directly, displayed, or redirected to a second system to be further processed in box 606.

Figure 7:
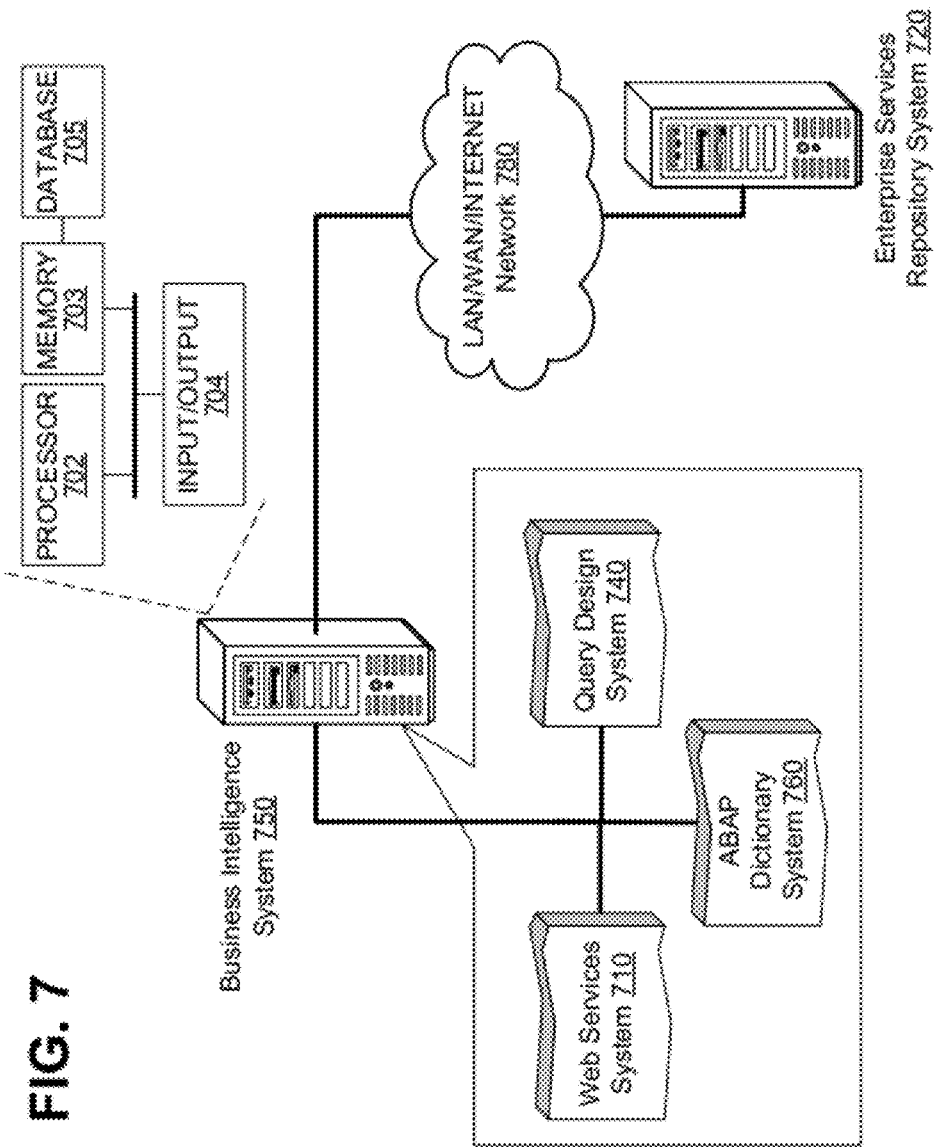
FIG. 7 shows exemplary systems in an embodiment of the invention.

FIG. 7 shows an embodiment of a business intelligence system 750 containing a web services system 710, ABAP dictionary system 760, and query design system 740. The web services system 710 and dictionary system 760 may be used to generate and instantiate a web service request. In this embodiment, an enterprise services repository system 720 and business intelligence system 750 are interconnected through network 780. In an embodiment, the query designer system 740, ABAP dictionary system 760, and web services system 710 may be part of a larger business intelligence system 750, though in another embodiment, some or all of these system may be separate.

Each of the systems in FIG. 7 may contain a processor 702, memory 703 containing a database 705, and an input/output interface 704, all of which are interconnected via a system bus. In various embodiments, each of the systems 710, 720, 730, 740, 750, and 760 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 703 may contain different components for retrieving, presenting, changing, and saving data. Memory 703 may include a variety of memory devices, for example, Dynamic Random Access Memory (DRAM), Static RAM (SRAM), flash memory, cache memory, and other memory devices. Additionally, for example, memory 703 and processor(s) 702 may be distributed across several different computers that collectively comprise a system.

Processor 702 may perform computation and control functions of a system and comprises a suitable central processing unit (CPU). Processor 702 may comprise a single integrated circuit, such as a microprocessor, or may comprise any suitable number of integrated circuit devices and/or circuit boards working in cooperation to accomplish the functions of a processor. Processor 702 may execute computer programs, such as object-oriented computer programs, within memory 703.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

We claim:

1. A computer-implemented method comprising:
    parsing a business intelligence query using a processor, the business intelligence query structured in an object access protocol format recognized by a plurality of business intelligence systems;
    identifying from the parsing a plurality of data elements and values of the data elements in the query;
    identifying a web service output field corresponding to each identified data element from a mapping of web service output fields to business intelligence query data element fields;
    restructuring the plurality of data elements and values into a plurality of requests, each request, when executed by the business intelligence system, causing the business intelligence system to identify a result and metadata in the business intelligence system corresponding to at least one of the data elements and values;
    sending the requests to the business intelligence system to be executed;
    receiving the identified results and metadata from the business intelligence system;
    identifying additional content in an enterprise services repository corresponding to an object in the received metadata of each request from a mapping of metadata objects to enterprise services repository content; and
    incorporating the identified web service output fields, the received identified results and metadata from the business intelligence system, and the identified additional content in the enterprise services repository into a data set output associating the web service output fields with respective identified results and metadata from the business intelligence system and respective identified additional content obtained from the enterprise services repository.

2. The method of claim 1, further comprising sending the data set output to the enterprise service repository system.

3. The method of claim 2, further comprising extracting data from the data set output in the enterprise service repository system and storing the extracted data in fields corresponding to the web service output fields of the data set output.

4. The method of claim 1, wherein a each mapping is adaptively suggested by a processor based on mappings previously applied to similar data elements and metadata objects.

5. The method of claim 1, wherein the business intelligence system stores the data elements and data relating to the data elements.

6. The method of claim 1, further comprising sending the data set output to a second computing system, the second computing system identifying data in the data set output based on the web service output fields in the data set output.

7. The method of claim 6, wherein the second computing system extracts the respective identified results and metadata from the business intelligence system and respective identified additional content obtained from the enterprise services repository associated with a selected web service output field and incorporates the extracted data in another application program.

8. The method of claim 7, wherein the second computing system is an enterprise service repository system.

9. The method of claim 1, wherein the object access protocol format recognized by a plurality of business intelligence systems is an extensible markup language for analytics (XMLA).

10. The method of claim 9, wherein the data set output is in a second format not supported by XMLA.

11. The method of claim 10, wherein the second non-XMLA format includes semantic descriptions of the identified results from the business intelligence system obtained in part from the additional content from the enterprise services repository.

12. The method of claim 11, wherein the semantic descriptions include an identifier of the data element corresponding to the result.

13. The method of claim 11, wherein the semantic descriptions include a corresponding data element variable name.

14. The method of claim 11, wherein the semantic descriptions include an identifier of a web service output field mapped to a respective data element.

15. The method of claim 14, wherein the identifier of the web service output field is obtained from the mapping of web service output fields to business intelligence Query data element fields.

16. A web services system including a processor, a memory coupled to the processor, and an input/output interface coupled to the processor and a communications network, the web services system configured to executed instructions at the processor to:
  parse a business intelligence system query, the business intelligence system query structured in an object access protocol format recognized by a plurality of business intelligence systems;
  identify from the parsing a plurality of data elements and values of the data elements in the query;
  identify a web service output field corresponding to each identified data element from a mapping of web service output fields to business intelligence query data element fields;
  restructure the plurality of data elements and values into a plurality of requests, each request, when executed by the business intelligence system, causing the business intelligence system to identify a result and metadata in the business intelligence system corresponding to at least one of the data elements and values;
  send the requests to the business intelligence system to be executed;
  receive the identified results and metadata from the business intelligence system;
  identify additional content in an enterprise services repository corresponding to an object in the received metadata of each request from a mapping of metadata objects to enterprise services repository content; and
  incorporate the identified web service output fields, the received identified results and metadata from the business intelligence system, and the identified additional content in the enterprise services repository into a data set output associating the web service output fields with respective identified results and metadata from the business intelligence system and respective identified additional content obtained from the enterprise services repository.

17. An article of manufacture comprising a computer-readable media tangibly storing instructions that, when executed by a processor, cause the processor to:
  parse a business intelligence system query, the business intelligence system query structured in an object access protocol format recognized by a plurality of business intelligence systems;
  identify from the parsing a plurality of data elements and values of the data elements in the query;
  identify a web service output field corresponding to each identified data element from a mapping of web service output fields to business intelligence query data element fields;
  restructure the plurality of data elements and values into a plurality of requests, each request, when executed by the business intelligence system, causing the business intelligence system to identify a result and metadata in the business intelligence system corresponding to at least one of the data elements and values;
  send the requests to the business intelligence system to be executed;
  receive the identified results and metadata from the business intelligence system;
  identify additional content in an enterprise services repository corresponding to an object in the received metadata of each request from a mapping of metadata objects to enterprise services repository content; and
  incorporate the identified web service output fields, the received identified results and metadata from the business intelligence system, and the identified additional content in the enterprise services repository into a data set output associating the web service output fields with respective identified results and metadata from the business intelligence system and respective identified additional content obtained from the enterprise services repository.

* * * * *